Feb. 22, 1966  YOJI INABA ETAL  3,237,070
SELF-BALANCING POSITIONAL SERVO SYSTEM
Filed July 31, 1963
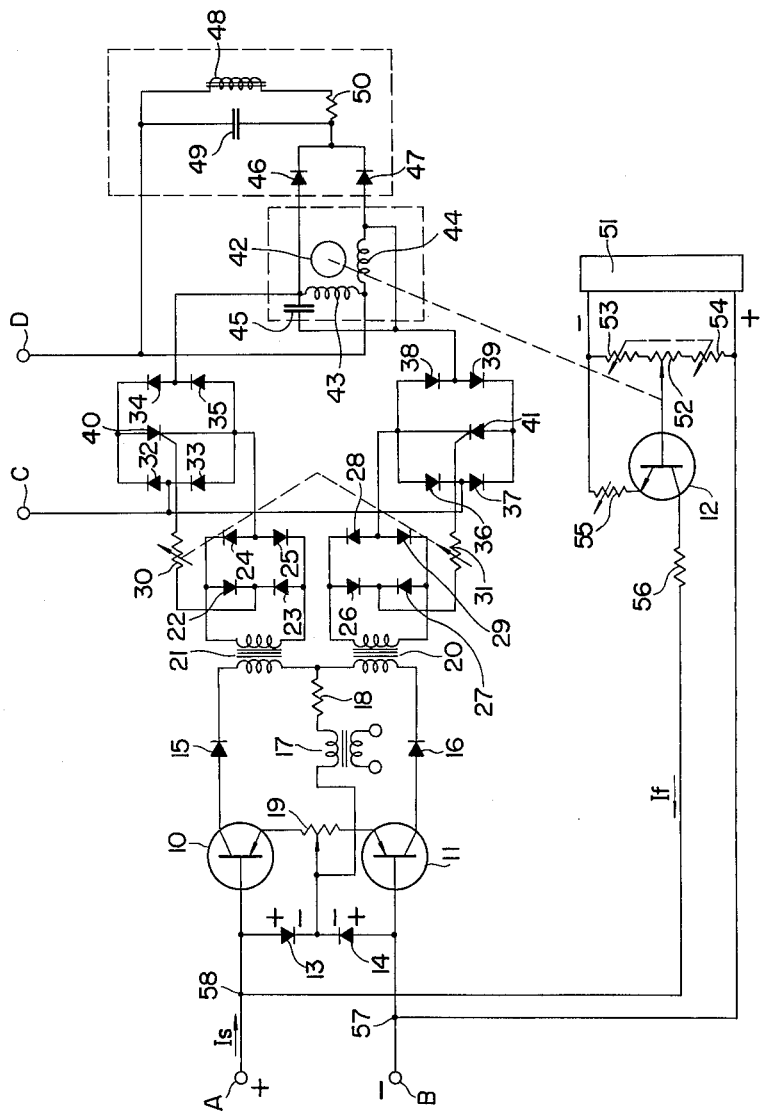
INVENTORS.
YOJI INABA
KEN SHIRAGAKI
BY Arthur H. Swanson
ATTORNEY.

3,237,070
SELF-BALANCING POSITIONAL SERVO SYSTEM
Yoji Inaba, Nerima-ku, Tokyo, and Ken Shiragaki, Fuzisawa, Japan, assignors to Honeywell Inc., a corporation of Delaware
Filed July 31, 1963, Ser. No. 298,982
Claims priority, application Japan, Aug. 2, 1962, 37/32,226
2 Claims. (Cl. 318—28)

This invention relates to an electric actuator and more particularly, to a small-sized, electric actuator of high performance for receiving an electric signal from an electric controller and controlling the position in proportion to the magnitude of the electric signal.

Heretofore, in an electric valve used for driving a valve or a damper, the valve is controlled by continuous monitoring of the degree of opening of the valve from a remote point or by rotating a motor by means of the on-off signals of an electric controller and using the slide wires of the electric controller which stand in both sides of meter and motor of the controller and thereby a proportional controlling can be effected. Since, as stated above, an electric valve or a slide wire is employed, the accuracy of the operation in the prior art is necessarily lowered.

Therefore, one object of this invention is to provide an electric actuator consisting of a plurality of transistors, a plurality of diodes, a plurality of silicon controlled rectifiers (referred to as SCR, hereinafter), a balancing motor and an electromagnetic brake device.

Another object of this invention is to provide an electric actuator by which a more accurate operation can be obtained.

A single drawing shows the connection diagram of an embodiment of the electric actuator provided in accordance with this invention.

In the single drawing, the cathodes of diodes 13 and 14 are connected to the slider of variable resistance 19 and the anodes of the two diodes are connected to input terminals A and B and the base electrodes of transistors 10 and 11, respectively. The collector electrode of transistor 10 is connected to the collector electrode of transistor 11 through diode 15, the primary winding of current transformer 21, the primary winding of current transformer 20 and diode 16. The emitter electrode of transistor 10 is connected to the emitter electrode through variable resistance 19. An input transformer 17 for the biasing current source and limiting resistor 18 for the maximum current are connected between the slider of variable resistance 19 and a junction of the two primary windings of current transformers 20 and 21.

The secondary winding of current transformer 20 is connected to the gate of SCR 41 through a rectifying circuit consisting of diodes 26, 27, 28 and 29 and a resistance 31 for adjusting the blind sector. The output of the switching circuit consisting of diodes 36, 37, 38 and 39 and SCR 41 is applied to winding 44 of balancing motor 42 directly and to winding 43 of balancing motor 42 through condenser 45. The secondary winding of current transformer 21 is connected to the gate of SCR 40 through a rectifying circuit consisting of diodes 22, 23, 24 and 25 and a resistance 30 for adjusting the blind sector. The output of the switching circuit consisting of diodes 32, 33, 34 and 35 and SCR 40 is applied to winding 43 of balancing motor 42 directly.

The balancing motor 42 is a two phase servo-motor having two windings 44 and 45 whose phase difference is 90° electrically and one end of each of the two windings are connected to terminal D of the source for driving electric motor 42. Terminal C of the source is connected to the input terminals of the switching circuits. The other ends of the two windings are connected to one end of the winding of the electromagnetic brake consisting of electromagnetic coil 48, condenser 49 and resistance 50 through diodes 46 and 47 from the positive side to the negative side. The other end of the winding of the electromagnetic brake is connected to terminal D.

The collector electrode of transistor 12 is connected to input terminal A through resistance 56 and the emitter electrode of transistor 12 is connected to one terminal of a constant voltage means 51 through variable resistance 55 for adjusting the span of the voltage. The other terminal of the constant voltage means is connected to input terminal B. A series circuit consisting of variable resistances 53 and 54 for adjusting zero point and a potentiometer 52 is connected between the two terminals of the constant voltage means. The base electrode of transistor 12 is connected to the slider of potentiometer 52 and the slider is interlocked with balancing motor 42.

The operation of the circuit shown is explained as follows:

When input signal current $I_s$ is applied to input terminals A and B current $I_s$ passes through diode 13 and transistor 11 from terminal A to terminal B, diode 13 and transistor 11 being a member of the polarity discriminating circuit consisting of diodes 13 and 14 and transistors 10 and 11. Collector current $I_c$ passes through to cause a voltage on the secondary winding of current transformer 20. The biasing voltage for transistors 10 and 11 is obtained by applying an alternating current of 50 cycle/sec. to transformer 17 and rectifying it by diodes 15 and 16. Resistance 18 limits the maximum current of the primary windings of current transformers 21 and 22. Variable resistance 19 is a balancing resistance of about 5 to 8 ohms. The voltage induced in the secondary winding of current transformer 20 is rectified by the full wave rectifying circuit consisting of diodes 26, 27, 28 and 29 and passes through resistance 31 to the gate of SCR 41 to ignite SCR 41. When the switching circuit consisting of diodes 36, 37, 38 and 39 and SCR 41 is in an "on" state, the voltage for driving the balancing motor is applied to balancing motor 42. By the rotation of balancing motor 42 potentiometer 52 is driven through a reduction gear so that the collector current of transistor 12 changes. The biasing current of transistor 12 is fed by constant voltage means. The collector current of transistor 12 is of the same magnitude as the feedback current $I_f$ and the feedback current $I_f$ is fed back to terminals 57 and 58. Balancing motor 42 rotates until the feedback current $I_f$ becomes equal to the input signal current $I_s$.

If the feedback current $I_f$ is larger than the input signal current $I_s$, the polarity discriminating circuit consisting of diode 14 and transistor 10 operates to generate a voltage in the secondary winding of current transformer 21. This voltage is rectified by the rectifying circuit consisting of diodes 22, 23, 24 and 25 and applied to the gate of SCR 40 through resistance 30. The switching circuit consisting of diodes 32, 33, 34 and 35 and SCR 40 then becomes in an "on" state so that balancing motor 42 rotates until the feedback current $I_f$ becomes equal to the input signal current $I_s$.

As stated above, balancing motor 42 rotates in the direction determined by the decrease between the input signal current $I_s$ and the feedback current $I_f$, and, therefore the position of the electric actuator of subject invention is proportional to the input signal. When precision control is required, the electromagnetic brake consisting of electromagnetic coil 48, condenser 49 and resistance 50 is connected in parallel to balancing motor 42 and, thereby an extremely precise operation is obtained. To this end, as shown in the drawing, the positive terminals of diodes 46 and 47 are connected to windings 43 and 44, respectively, of balancing motor, and the negative terminals of diodes 46 and 47 are connected together to one end of the electromagnetic brake. The other end of the electromagnetic brake is connected to the common terminal of the two windings of the balancing motor. Further, if a special character is given to the feedback means, the position in proportion to the input signal is controlled in an exponential function method or in a square method.

From the above description it can be seen that the electric actuator of subject invention can control position in proportion to the magnitude of the electric signal. While a preferred embodiment of present invention is disclosed in the figure, it is recognized that the scope of the present invention is not limited thereto and it is therefore not intended that the scope of the present invention be defined by the scope of the appended claims.

What is claimed is:

1. An electric actuator for controlling position in proportion to the magnitude of an input signal comprising: two polarity discriminating circuits consisting of two diodes and two transistors for discriminating the difference between an input signal current and a feedback signal current; two pairs of switching circuits receiving the output signal of said discriminating circuits through a current transformer and a rectifying circuit and consisting of a plurality of diodes and silicon controlled rectifiers; a balancing motor having windings adapted to receive the output signals of each of said switching circuits; a potentiometer having a slider interlocking with said balancing motor; and a feedback circuit connected to said potentiometer and generating said feedback signal.

2. An electric actuator for controlling position in proportion to the magnitude of an input signal comprising: two polarity discriminating circuits consisting of two diodes and two transistors for discriminating the difference between an input signal current and a feedback signal current; two pairs of switching circuits receiving the output signal of said discriminating circuits through a current transformer and a rectifying circuit and consisting of a plurality of diodes and silicon controlled rectifiers; a balancing motor having windings adapted to receive the output signals of each of said switching circuits; a potentiometer having a slider interlocking with said balancing motor; a feedback circuit connected to said potentiometer and generating said feedback signal; and an electromagnetic brake consisting of diodes connected to the two windings of said balancing motor and an electromagnetic coil.

References Cited by the Examiner

UNITED STATES PATENTS

| | | | |
|---|---|---|---|
| 2,956,222 | 10/1960 | Hill et al. | 318—207 X |
| 3,109,971 | 11/1963 | Welch et al. | 318—30 |
| 3,168,691 | 2/1965 | Olofsson et al. | 318—207 |
| 3,181,046 | 4/1965 | Sulton | 318—207 X |
| 3,183,425 | 5/1965 | Slawson | 318—227 |

JOHN F. COUCH, *Primary Examiner.*